Patented Jan. 29, 1929.

1,700,342

UNITED STATES PATENT OFFICE.

EDOUARD URBAIN, OF PARIS, FRANCE, ASSIGNOR TO URBAIN CORPORATION, A CORPORATION OF DELAWARE.

DECOLORIZING CARBON.

No Drawing. Application filed July 10, 1926, Serial No. 121,737, and in France July 25, 1925.

Various methods have been suggested of producing decolorizing carbons, whereby the product is obtained in the first instance in a more or less granular form. For certain purposes, it is desired to have the carbon in the form of very fine powder or paste, and this is usually obtained simply by crushing the carbon after it is produced, and then if paste is wanted, water is added. I have found that such crushing tends to reduce the activity of the carbon and have discovered a manner in which this difficulty can be overcome. If active carbon adapted for decolorizing or other purposes is ground in a liquid, particularly a liquid having a relatively strong capillary tension, a fine product is obtained without any material loss of activity. Water is a suitable liquid to use for this purpose, but other liquids may be used if desired such as oils or hydrocarbons. Enough liquid should be used so that the material is thoroughly wet. After crushing, any excess liquid may be drained off, and the resulting product may, if desired, be dried out in any usual manner. In some cases vacuum may be advantageous in reducing the drying temperature. If the carbon is to be used as a paste, as for example, in wine making, it will not be necessary to dry out the ground material.

What I claim is:

As a new product, a paste comprising decolorizing carbon and a liquid which are thoroughly mixed together by grinding.

EDOUARD URBAIN.